(12) United States Patent
Sabo

(10) Patent No.: US 9,038,408 B2
(45) Date of Patent: May 26, 2015

(54) WASTEWATER EFFLUENT TO GEOTHERMAL HEATING

(71) Applicant: A.K. Industries, Inc., Plymouth, IN (US)

(72) Inventor: Stephen A Sabo, South Bend, IN (US)

(73) Assignee: AK Industries, Inc., Plymouth, IN (US)

( * ) Notice: Subject to any disclaimer, the term of this patent is extended or adjusted under 35 U.S.C. 154(b) by 0 days.

(21) Appl. No.: 14/175,769

(22) Filed: Feb. 7, 2014

(65) Prior Publication Data

US 2014/0151276 A1    Jun. 5, 2014

Related U.S. Application Data

(63) Continuation-in-part of application No. 13/333,372, filed on Dec. 21, 2011, now abandoned, which is a continuation-in-part of application No. 13/030,306, filed on Feb. 18, 2011, now abandoned.

(51) Int. Cl.
| | |
|---|---|
| *F25D 23/12* | (2006.01) |
| *F24J 3/08* | (2006.01) |
| *C02F 3/12* | (2006.01) |
| *C02F 3/28* | (2006.01) |

(52) U.S. Cl.
CPC  *F24J 3/085* (2013.01); *F24J 3/081* (2013.01); *Y02E 10/14* (2013.01); *C02F 3/1242* (2013.01); *C02F 2209/005* (2013.01); *C02F 2209/40* (2013.01); *C02F 2209/42* (2013.01); *Y02B 30/52* (2013.01); *Y02E 10/12* (2013.01); *C02F 3/288* (2013.01)

(58) Field of Classification Search
USPC .................................. 62/260, 324.3, 435
See application file for complete search history.

(56) References Cited

U.S. PATENT DOCUMENTS

| 4,257,239 | A  * | 3/1981 | Partin et al. ................. | 62/238.7 |
| 5,200,065 | A  * | 4/1993 | Sinclair et al. ............... | 210/104 |
| 5,874,002 | A  * | 2/1999 | Cormier ....................... | 210/626 |
| 8,408,840 | B2 * | 4/2013 | Dillard ........................... | 405/36 |
| 2007/0175806 | A1 * | 8/2007 | McKinney ..................... | 210/87 |

* cited by examiner

*Primary Examiner* — Sean Andrish
(74) *Attorney, Agent, or Firm* — Botkin & Hall, LLP

(57) ABSTRACT

A wastewater geothermal heat system is supplied with processed wastewater through a drip field in proximity to a thermal array part of a geothermal heat pump system. The wastewater treatment system portion provides a periodic source of treated wastewater. Several sensors and a control system regulate a pump that discharges wastewater from the treatment system and enters a drip field where it is released into the surrounding soil. The dampened soil provides an efficient vehicle to transfer heat into or out of a thermal array which is positioned adjacent to the drip field such that it is in contact with the soil that is dampened by the discharged wastewater.

3 Claims, 5 Drawing Sheets

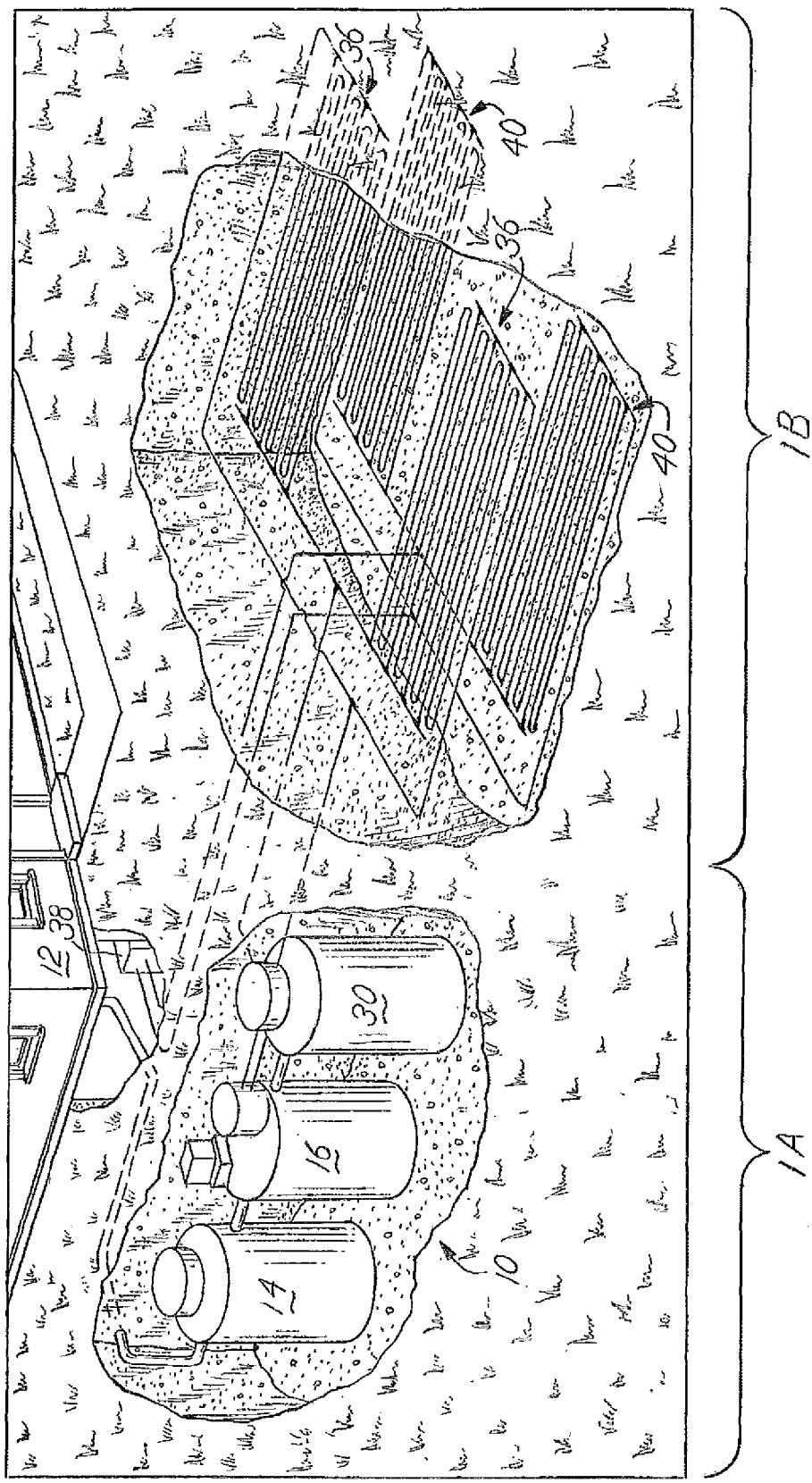

WASTEWATER EFFLUENT TO GEOTHERMAL HEATING

CROSS REFERENCE TO RELATED APPLICATIONS

This application is a Continuation-in-Part of U.S. application Ser. No. 13/1333,372 filed Dec. 21, 2011, which is a continuation of Ser. No. 13/030,306 filed Feb. 18, 2011, the disclosures of which are hereby incorporated by reference.

BACKGROUND OF THE INVENTION

Heat pumps are an efficient way to heat or cool a building and can be more energy efficient than traditional heating and cooling systems. In heating mode, the heat pump moves heat from a source of heat outside the building and introduces that heat into the building's heating system. In cooling mode, the heat pump moves heat from inside the building and relocates that heat out of the building. Heat is transferred to and from the building by pumping a compressible fluid through a heat exchanger. The heat exchanger is commonly configured as a series of pipes which have a large surface area for transferring heat. In many areas, above-ground air is an inadequate and unreliable source of heat for such pipes based on weather extremes, therefore it can be desirable to use subsoil pipes instead. This is an excellent choice for many areas where the pipes can be placed below the frost line such that the ground can act as a reliable near-constant source or sink for heat to allow for heating in the winter and cooling in the summer. Where available, the pipes may be submerged in a body of water. Doing so increases the efficiency to the system since heat is more readily transferrable with a liquid than with a solid such as soil.

The fluid housed in septic tanks and similar home wastewater treatment systems, is generally a higher temperature than the surrounding soil. Prior art systems have brought the heat transfer array pipes of a geothermal system in contact with the external area near a septic tank to benefit from heat within the septic tank. However, this can be expensive to install because many pipes will be needed around the septic tank to absorb heat from the tank. This can also be inefficient in areas where the ground is low in moisture content. Additionally, removing heat from the septic system alters the effectiveness of the bacteria which in turn reduces the efficacy of the treatment system.

SUMMARY OF THE INVENTION

This invention relates to a geothermal heat pump which exchanges heat with wastewater discharged from a home wastewater treatment system. The geothermal heat pump is interconnected with a series of tubes which serve to exchange heat with an attached building. Here, the heat pump's thermal transfer array is buried in close proximity to an array of perforated tubes, or drip field, which discharges wastewater from a wastewater treatment system. The discharged wastewater moistens the soil surrounding the heat pump array thereby increasing the efficiency of heat transfer from the array since heat transfer is generally more efficient from a liquid than a solid. The discharged wastewater also increases the temperature of the soil surrounding the heat transfer array, which further increases the efficiency of the heat pump.

Increasing the efficiency of a heat pump has many advantages. First, a heat transfer array in contact with moist earth more readily exchanges heat, and so can be sized smaller than an array in contact with dry earth. Second, a smaller heat transfer array requires fewer materials to build, thereby reducing the cost of the system. Third, a smaller heat transfer array requires less excavation during the installation process, both saving money and requiring less disturbance of the surrounding landscaping. Fourth, buildings built on a small parcel of land can benefit from geothermal heating using a small heat transfer array where a traditional heat transfer array may not fit on the property. Additionally, most of the excavation necessary to install heat transfer array is accomplished when a drip field is installed.

Accordingly, it is an object of the present invention to improve the efficiency of a geothermal heat transfer array through the use of discharge wastewater from a wastewater treatment system to the geothermal heat transfer array.

Through the use of a holding tank and a pump, the drip field's moisture content can be regulated by a control system to provide better heat transfer to the heat pump array when the thermostat in the structure calls for heating or cooling.

Other objects will become apparent upon a reading of the following description.

BRIEF DESCRIPTION OF THE DRAWINGS

A preferred embodiment of this invention has been chosen wherein:

FIG. 1 is a cutaway view of the three tank wastewater treatment system, the drip array and the geothermal array;

DESCRIPTION OF THE PREFERRED EMBODIMENT

Figure 1A:
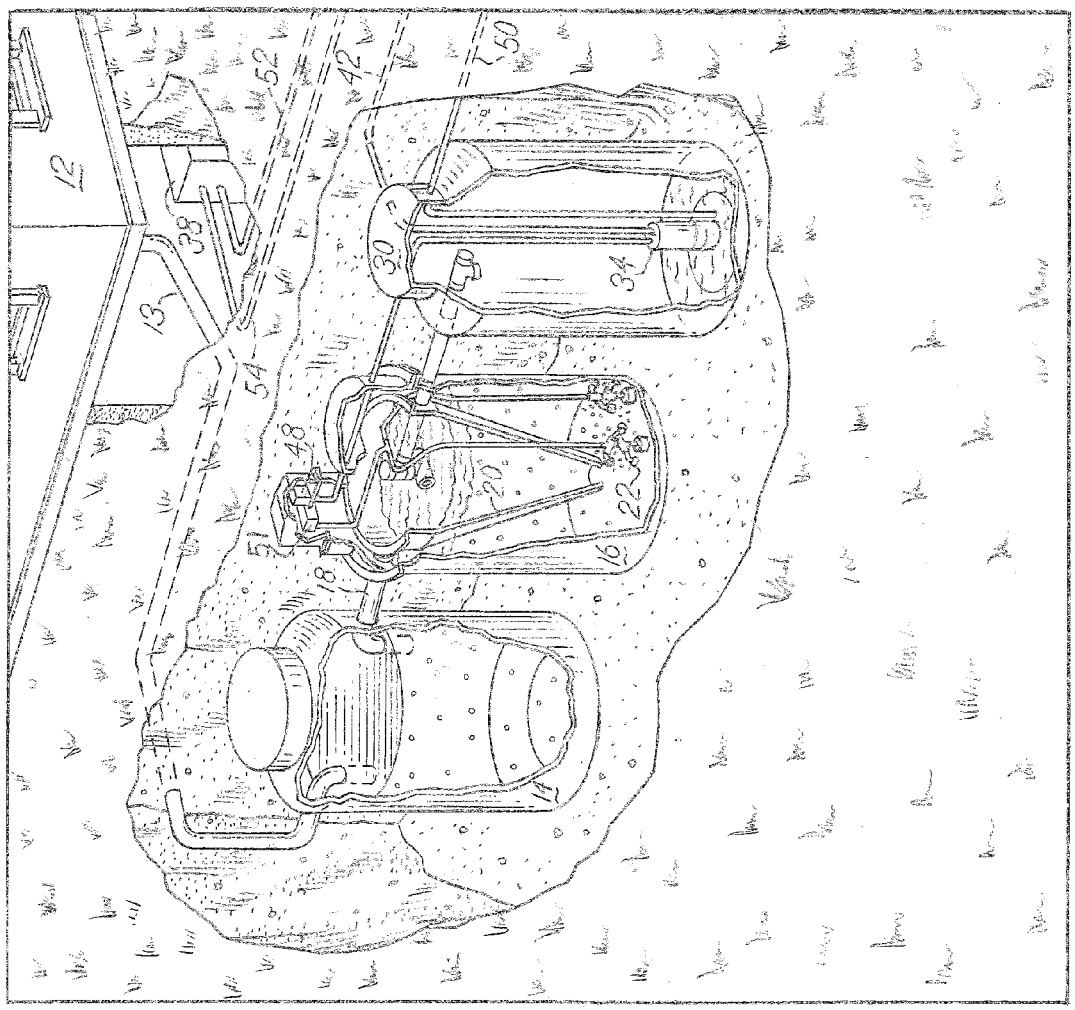
FIG. 1A is a detailed view of the wastewater treatment system shown in FIG. 1.

FIG. 1 shows an overview of the geothermal heating system of the present invention. Wastewater leaves a home 12 through a pipe 13 and enters a wastewater treatment system 10, shown as buried underground. The home 12 could also be a commercial building or other type of temperature-regulated structure. The wastewater treatment system is preferably a series of treatment tanks, as shown in FIGS. 1 and 1A or another similar system which utilizes the aerobic treatment of wastewater. A liquid pump 34 discharges treated wastewater from wastewater treatment system 10 to a drip field 36. Drip field 36 discharges the treated wastewater to the surrounding soil. A heat transfer array 40 is positioned near drip field 36 such that array 40 is in thermal contact with the wastewater discharged from drip field 36. Heat transfer array 40 is integrated with a heat pump 38 which is integrated with a heating or cooling system 39 in home 12.

In the preferred embodiment, the wastewater treatment system 10 includes a series of three tanks The first tank is a pretreatment tank 14 that reduces the solids in the wastewater. Pretreatment tank 14 is preferably a septic tank where anaerobic digestion of the wastewater is performed by anaerobic bacteria found in the wastewater. The wastewater then flows into a second tank 16 through pipe 18. The second tank is a clarifying tank 16. A cone 20 is centrally located within clarifying tank 16 and aerators 22 are located in the bottom of the clarifying tank and have air pumped through them to aerate the wastewater to aid aerobic bacteria in aerobic digestion of the waste. The aerobic bacteria in clarifying tank 16 works to further treat the wastewater exiting pretreatment tank 14, one result of which is the neutralization or minimization of anaerobic bacteria in the clarifying tank. The wastewater flows up through the open bottom of the cone 20 and out through an outlet pipe 26 positioned near the top of the cone. The outlet pipe 26 leads to a third tank, which is a holding tank 30. Holding tank 30 is used to store the treated wastewater prior to discharge and houses a liquid pump 34. Pump 34 is used to pump the treated wastewater out of holding tank 30 into a drip field 36. In another embodiment, a septic tank is located in line with pipe 13, with the septic tank accepting wastewater from home 12 and discharging wastewater to pretreatment tank 14 of the three tank system detailed above.

In practice, wastewater generally does not enter wastewater treatment system 10 at a constant rate. Instead, wastewater enters according to use of upstream connected systems, such as during a shower or after use of the toilet in home 12. Holding tank 30 and pump 34 can be configured with a controller 48 to buffer wastewater to allow for a customized discharge rate of wastewater from wastewater treatment system 10, as is described in more detail below, compared to the sporadic rate at which wastewater enters the system. A controlled discharge from treatment system 10 is preferred because this allows increased efficiency of heat pump 38 since pump 34 can meter discharged wastewater to array 40 in such a way that array 40 is contacted by the discharged wastewater when the heat pump is active. By discharging wastewater from treatment system 10, at only a rate necessary to wet the ground surrounding heat transfer array 40 when the heat pump is operating, the efficiency of heat pump 38 can be increased even when the treatment system is connected to a building with modest wastewater output, as detailed below.

Wastewater discharged from holding tank 30 may be used as a heat source for a heat transfer array 40. This wastewater provides an excellent source of heat for at least two reasons. One reason the wastewater in the holding tank is a good source of heat is the fact that some of the wastewater leaving home 12 is gray water. Gray water typically is at an elevated temperature relative to room temperature, such as from bathing, washing dishes, or washing clothes. Another reason for heat in the wastewater is due to the biological action of bacteria within the wastewater as it is digested in wastewater treatment tanks 14, 16. The wastewater contained in holding tank 30 makes an excellent source of heat because during a winter season the temperature of the wastewater in the holding tank 30 will be significantly higher than the outside air temperature, which increases the energy efficiency of heat transfer array 40. Further, since wastewater treatment system 10 is buried under ground, it is insulated from heat loss, since the ground generally has a more stable temperature as compared to the ambient air.

Figure 2:
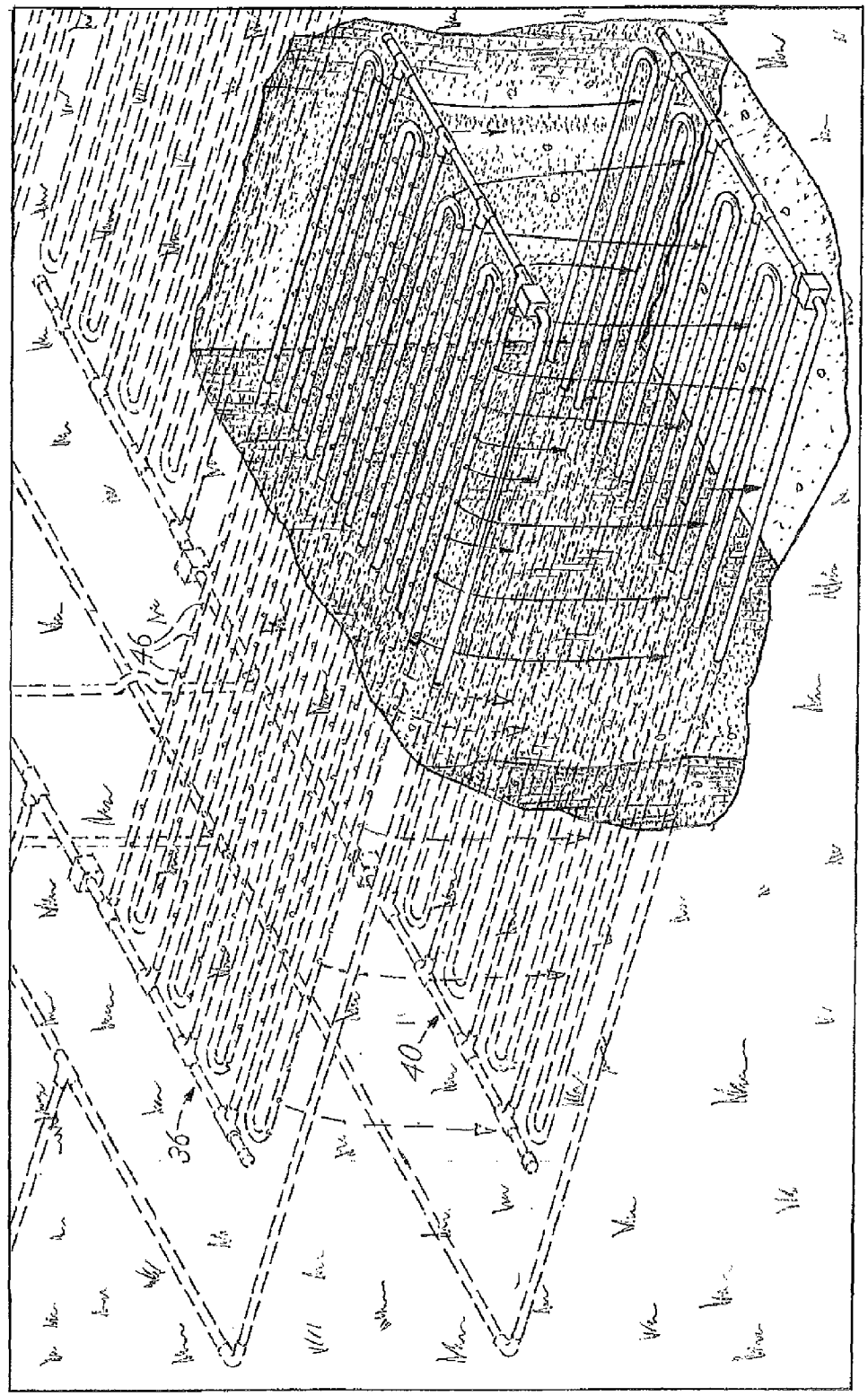
FIG. 2 is a cutaway view of the drip and geothermal arrays showing the movement of wastewater from the drip array to the geothermal array.
Figure 3:
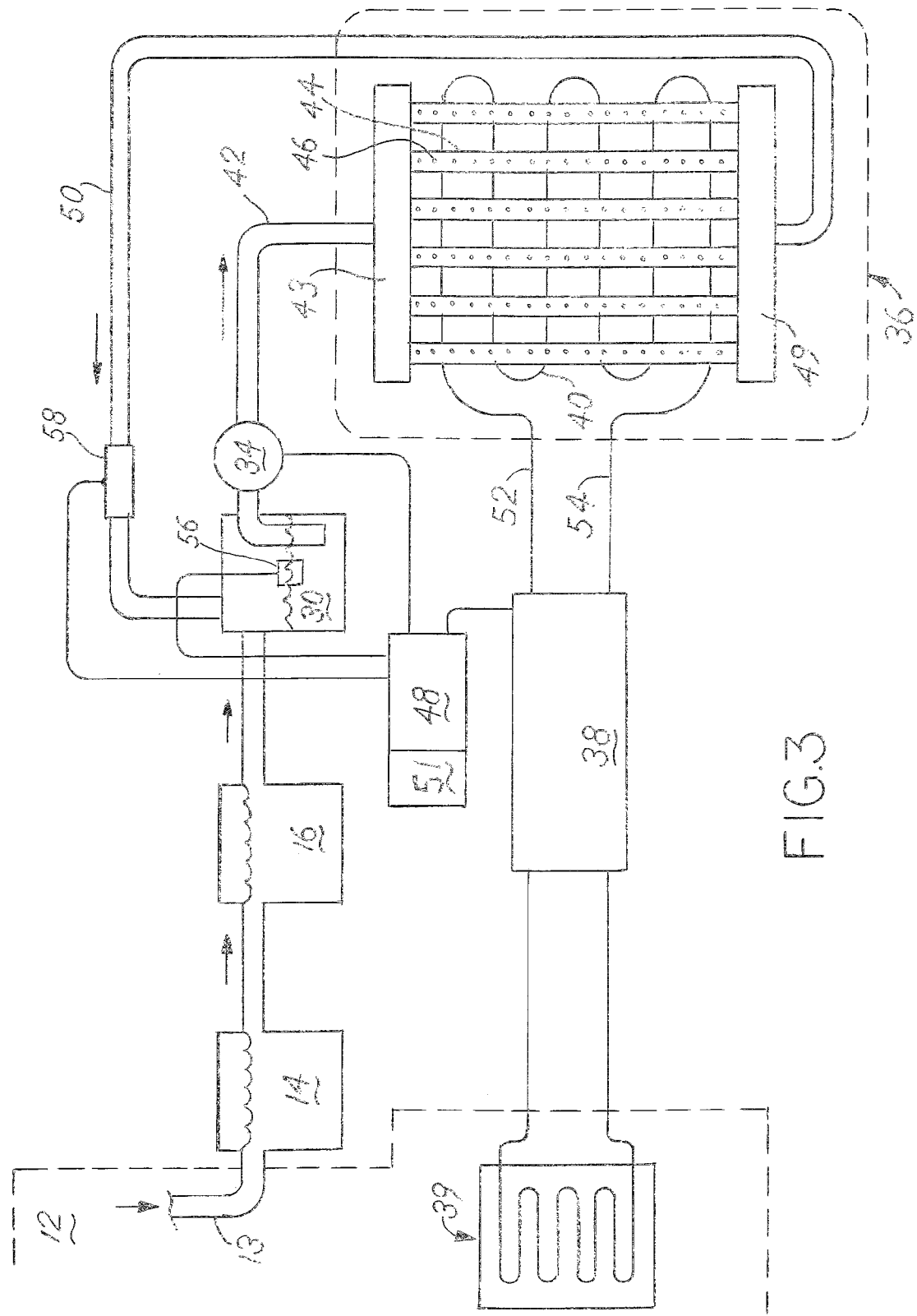
FIG. 3 is an overall schematic and flow diagram of the system.

Pump 34 moves wastewater from holding tank 30 into a transfer pipe 42. In one embodiment, a filter is located between holding tank 30 and transfer pipe 42 to remove residual solids or other matter from the discharged wastewater. The filter helps prevent solids from clogging drip field 36. Transfer pipe 42 connects holding tank 30 to drip field 36. This is shown in FIG. 1 and in FIG. 3. While FIG. 1 represents how the system is typically installed practice, FIG. 3 represents an overall schematic of how the system of FIG. 1 operates. The transfer pipe 42 may split into two or more lines in order to accommodate multiple drip fields. Each drip field 36 is composed of one or more fingers, hereinafter referred to as tubes 44 having perforations 46 running along the length thereof through which wastewater is discharged from the drip field. The perforations are well shown in FIG. 2 and FIG. 3.

Perforations 46 allow for the discharge of wastewater from tubes 44 into the soil about drip field 36. The discharged wastewater adds moisture to the ground in the proximity of the drip field. Heat pump 38 is connected to a heat transfer array 40 by fluid lines 52, 54. In FIG. 3, Heat pump 38 and heat transfer array 40 are components of a geothermal heating or cooling system 39 used to regulate the temperature of home 12 as is commonly known in the art. Heat transfer array 40 is used to transfer heat between the ground and home 12 by circulating a conducting fluid through heat transfer array 40 by heat pump 38. Heat transfer array 40 is buried adjacent drip field 36 so that the earth or ground surrounding the heat transfer array contains moisture discharged from drip field 36. Heat transfer array 40 is preferentially buried beneath drip field 36 to allow gravity to draw the discharged wastewater toward heat transfer array 40. Since heat is more readily transferred from a liquid than a solid, surrounding the ground about heat transfer array 40 with moisture increases its efficiency. The wastewater from drip field 36 is typically at an elevated temperature, relative to ambient temperature, which further improves the efficiency of heat transfer array 40.

Figure 1B:
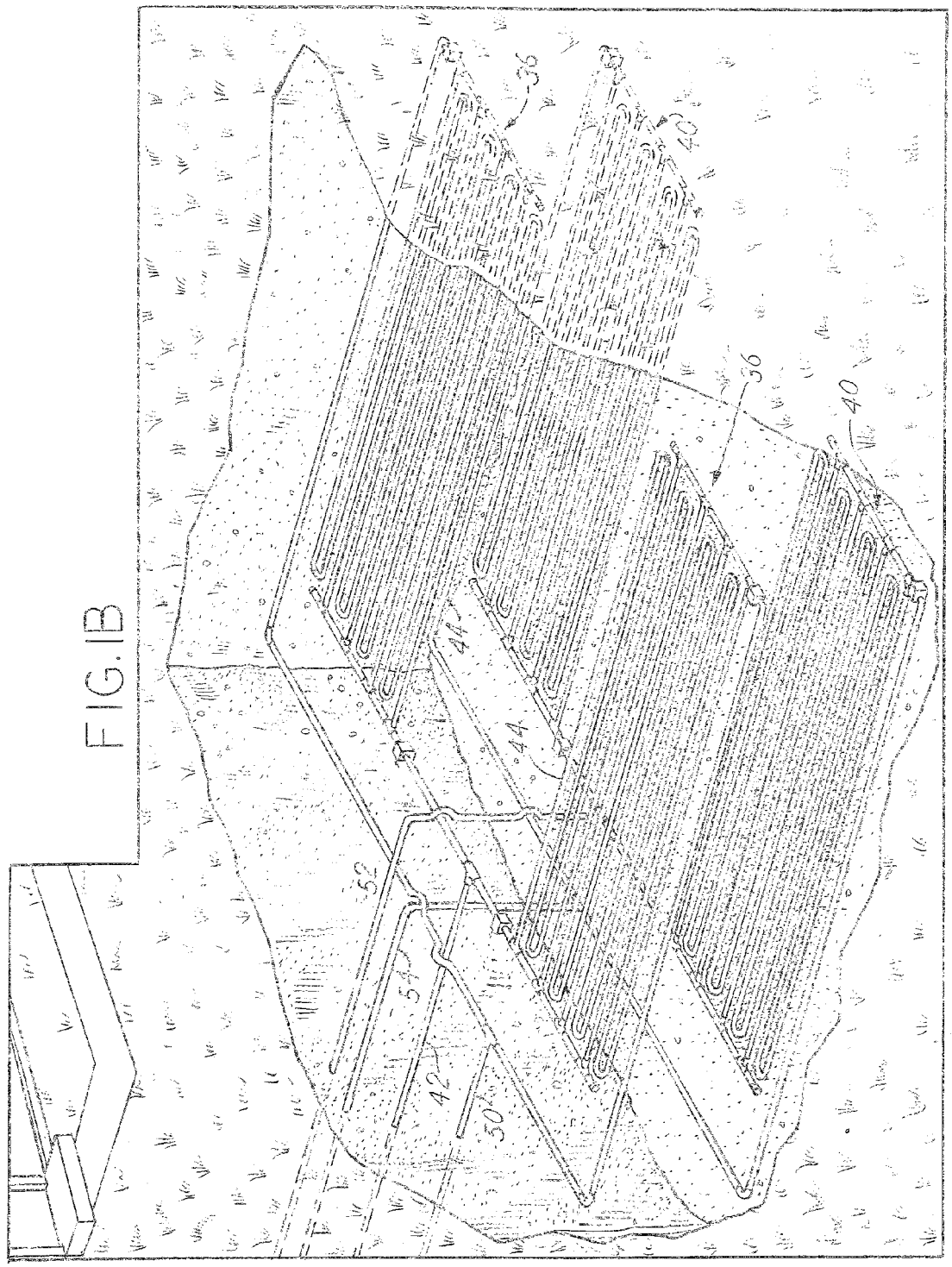
FIG. 1B is a detailed view of the drip and geothermal arrays shown in FIG. 1.

Drip field 36 is preferentially sized as the cross-sectional shape of heat transfer array 40. Heat transfer array 40 could be designed in a variety of shapes, as is known in the art. For example, heat transfer array 40 could be a relatively compact series of serpentine pipes, as shown in FIG. 1B, or could be a series of elongated interconnected pipes covering a long and narrow area. Heat transfer array 40 could also be a single pipe. As such, drip field 36 can be custom-esigned to mirror the shape of any heat transfer array so as to discharge wastewater to the soil surrounding the heat transfer array. In this way, a heat transfer array can be custom designed to fit an existing drip field, or a drip field can be custom designed to fit an existing heat transfer array, or both the drip field and heat transfer array can be designed to fit a uniquely-shaped parcel of land, each sized to closely match the other. That is to say that the shape and layout of the drip field and heat transfer array are readily customizable to adapt to a given use.

Each drip field 36 has an inlet 43 that receives wastewater. This inlet 43 may be a single pipe with multiple tubes 44 that extend from the inlet 43 to an outlet 49. The flow direction of wastewater is from the inlet to the outlet. The outlet is connected to a recycle line. The recycle line 50 is an unobstructed pipe that provides a flow path of wastewater back to the holding tank.

Wastewater treatment system in FIG. 3 includes a series of control mechanisms which dictate the flow rate of wastewater out of holding tank 30 and to drip field 36. Holding tank 30 includes at least one level sensor 56 positioned within the tank. The level sensor 56 is integrated with a controller 48 which can vary the rate pump 34 discharges wastewater from holding tank 30 to drip field 36. The level sensor 56 can be incorporated with an on-demand wastewater discharge system where pump 34 is activated according to the height of wastewater in the holding tank 30. Additionally, the level sensor 56 can serve as part of a warning system which sends a signal to controller 48 when the wastewater level reaches either a critically high or critically low level in holding tank 30, with the controller activating pump 34 and/or an alarm accordingly.

Controller 48 may be programmed in a number of ways to dictate the operation of pump 34 to increase the efficiency of heat transfer array 40. The controller 48 is programmed to vary the flow rate of wastewater to drip field 36 so as to ensure that moisture surrounds heat transfer array 40 when the home heating or cooling system 39 is operating. The controller 48 is connected to a timer 49 51 such that pump 34 may be activated according to a user-defined or periodic schedule. The controller 48 is electronically connected to the heat pump controller that as the heat pump cycles on a signal may be sent to the controller to activate pump 34. This is done to ensure wastewater remains available to wet the heat transfer array 40 even when the flow of wastewater into the system is uneven. The controller 48 can be programmed to dispense wastewater at a rate that will allow wastewater to be discharged through drip field 36 at a slow and constant rate so that heat transfer array 40 will remain in contact with moisture at all times. A water or moisture sensor 58 in return line 50 to further optimize the use of pump 34. Various other control schemes, as are known in the art, could be programmed in controller 48 for the purpose of optimizing the use of pump 34 such that heat transfer array 40 is surrounded by moisture during operation, such as any combination of timers, moisture sensors, valves or integration with the heat pump controls.

For septic treatment systems, the wastewater discharged from drip field 36 is preferably treated prior to discharge. In the preferred embodiment, any anaerobic bacteria in the wastewater are neutralized prior to discharge from drip field 36. In typical anaerobic wastewater treatment systems, the discharged wastewater will include living anaerobic bacteria which when discharged into the ground forms a biomat proximate drip field 36. Biomat is a layer of bacteria and other matter having a slimy or tar-like consistency which forms a barrier which slows or stops the flow of water. Any restriction of treated wastewater flow through the drip field would reduce the overall moisture content around the thermal transfer array and the efficacy of the system.

The wastewater exiting holding tank 30 will preferably have been treated prior to discharge. In the typical configuration, most of the solid waste would have settled out of the wastewater in pretreatment tank 14. Much of the residual solid waste would be digested by aerobic bacteria in clarifying tank 16. The wastewater exiting holding tank 30 may have dissolved particulates, as a result of the treatment process, which can serve as a fertilizer when discharged through drip field 36. Drip field 36 can be located in the ground in an area where fertilizer is needed, providing an environmentally conscious alternative to adding commercial fertilizer to the landscaping, with heat transfer array 40 positioned adjacent the drip field.

In the preferred embodiment, drip field 36 is connected to a recycle line 50. When the ground surrounding drip field 36 is saturated with water, recycle line 50 returns any excess wastewater in drip field 36 to the treatment system 10 or holding tank 30, so that the wastewater can be discharged at a later time when the ground has a lower moisture content.

A valve may be included to ensure one directional flow into the drip field 36. The valve can be a vacuum breaker, check valve or any other one-way valve to prevent backflow of wastewater in drip field 36, as is known in the art. Additionally, valves can serve to regulate or smooth the flow of wastewater through the drip field. Valve can also be used to achieve substantially higher or lower flow rates through the drip field depending on the configuration of the system, the expected flow rate from the wastewater treatment system, moisture or water detected in the return line sensor 58, or the amount of moisture needed for the geothermal array. In the preferred embodiment, controller 48 activates pump 34, according to a control scheme described above, and discharges wastewater to drip field at an optimum rate, with recycle line 50 returning any excess wastewater from the drip field to holding tank 30. In this way, drip field 36 discharges wastewater in a way that optimizes the efficiency of the geothermal heating system.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A geothermal heat system comprising:
    a waste tank having a waste tank inlet for receiving wastewater from a wastewater source, said waste tank having a waste tank outlet;
    a clarifying tank having a clarifying tank inlet and a clarifying tank outlet, said clarifying tank inlet for receiving wastewater from said waste tank outlet;
    an aerator providing oxygen to said clarifying tank wherein aerobic decomposition of said wastewater is encouraged;
    a holding tank having a holding tank inlet for receiving wastewater from said clarifying tank, said holding tank having a holding tank outlet and a level sensor for detecting the level of said wastewater in said holding tank;
    a liquid pump for dispensing wastewater from said holding tank to said holding tank outlet;
    a drip field in fluid communication with said holding tank outlet, said drip field having an inlet for receiving wastewater and an outlet for discharging said wastewater, a tube having perforations therethrough, providing fluid communication between said drip field inlet and said drip field outlet, said perforations in said tube discharging said wastewater, said drip field outlet discharging excess wastewater that is not discharged through said perforations;
    a recycle line in unobstructed fluid communication between said outlet of said drip field and said geothermal heat system for returning said excess wastewater to said wastewater treatment system;
    a heat-transferring array positioned below said drip field wherein said array is in thermal communication with said wastewater discharged through said perforations;
    a heat pump in fluid communication with said heat-transferring array; and
    a water sensor in said recycle line in electrical communication with a controller to indicate the presence of said excess wastewater from said drip field outlet.

2. A wastewater geothermal heating and cooling system comprising:
    a holding tank for receiving wastewater from a source, said tank having an inlet and an outlet;
    a level sensor in said holding tank for determining the wastewater level in said holding tank;
    a fluid pump having an inlet and an outlet, said inlet in fluid communication with said wastewater in said holding tank;
    a drip field, in fluid communication with said outlet of said fluid pump, having an inlet for receiving wastewater, and an outlet and having a plurality of holes between said drip field inlet and said drip field outlet for discharging processed wastewater, wherein excess wastewater not discharged from said holes is discharged from said drip field outlet, and a return line connected to said drip field outlet, said return line in fluid communication with said holding tank in unobstructed flow for returning said excess wastewater to said holding tank;

a heat pump in fluid communication with a thermal transfer array and a heat exchanger, said thermal transfer array in thermal communication with said drip field;

a return line, in fluid communication with said outlet of said drip field and said holding tank, said return line having unrestricted flow between said outlet of said drip field and said holding tank;

a controller, in electrical communication said level sensor, said fluid pump, and said heat pump, said controller determining the rate of said wastewater into said drip field; and a water sensor in said recycle line in electrical communication with said controller to indicate the presence of said excess wastewater from said drip field outlet.

3. The wastewater geothermal heating and cooling system of claim 2, said controller using said sensors and pump to optimize the efficiency of said heating and cooling system.

* * * * *